Nov. 22, 1960   J. MÜLLER   2,961,254
MOTOR VEHICLE WITH TILTING MECHANISM
Filed July 19, 1955  2 Sheets-Sheet 1

INVENTOR
JOSEF MÜLLER

BY *Dicke and Craig*
ATTORNEYS

Nov. 22, 1960        J. MÜLLER        2,961,254
MOTOR VEHICLE WITH TILTING MECHANISM
Filed July 19, 1955        2 Sheets-Sheet 2
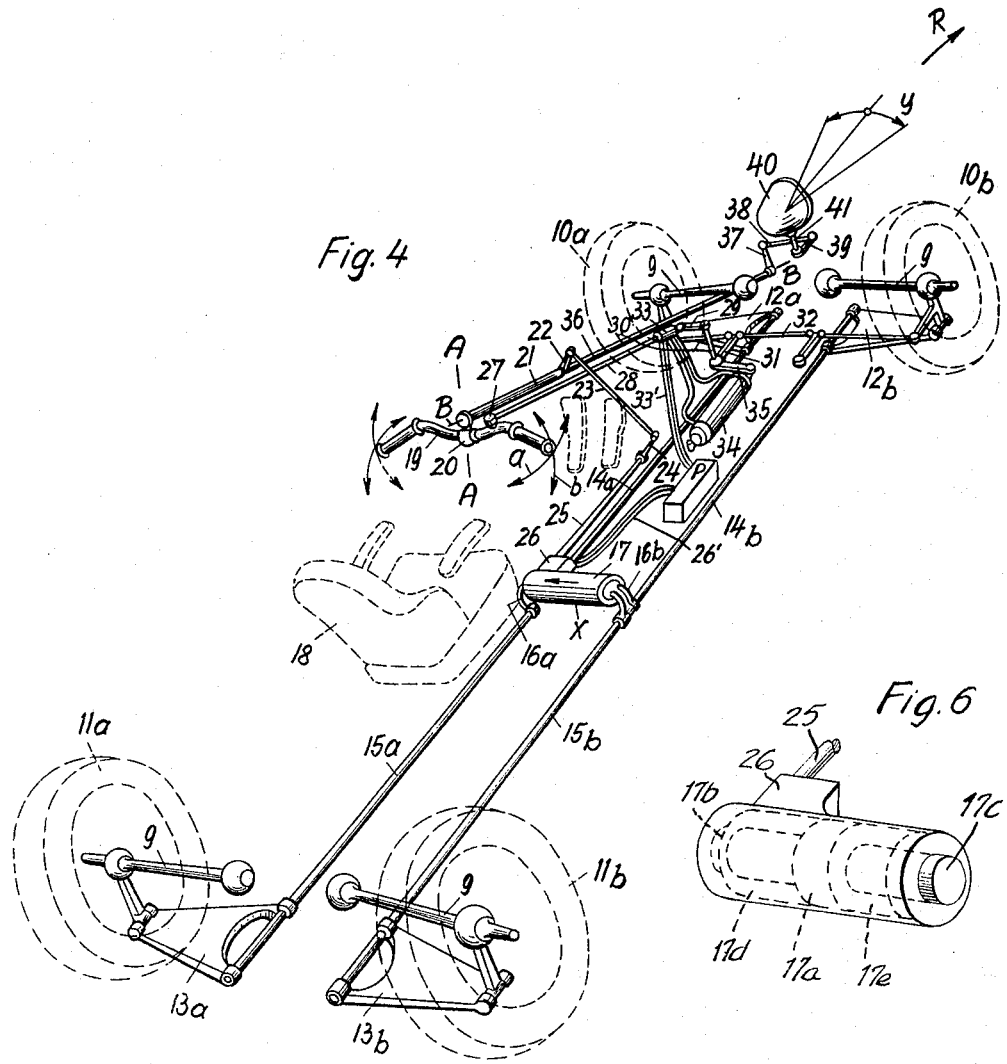
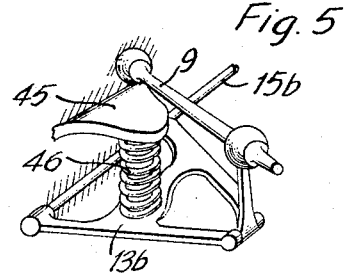
INVENTOR
JOSEF MÜLLER
BY Dicke and Craig
ATTORNEYS.

United States Patent Office 2,961,254
Patented Nov. 22, 1960

2,961,254

MOTOR VEHICLE WITH TILTING MECHANISM

Josef Müller, Stuttgart, Germany, assignor to Daimler-Benz Aktiengesellschaft, Stuttgart-Unterturkheim, Germany Filed July 19, 1955, Ser. No. 523,004

Claims priority, application Germany July 19, 1954

20 Claims. (Cl. 280—112)

The present invention relates to a motor vehicle which is provided with a mechanism for tilting the body of the vehicle toward the inside of a curve through which the vehicle is driven, and in a direction opposed to the centrifugal force acting upon the vehicle.

Although mechanisms of this kind have been proposed prior to this invention they all had the disadvantage that they did not operate until after the vehicle had already started to enter the curve, so that at the moment when the vehicle was beginning to turn from the straight driving direction into the curve, the car body did not as yet assume a tilting position toward the inside of the curve.

It is an object of the present invention to provide a mechanism which permits the car body to be tilted at the proper time and even prior to the time when the vehicle actually enters the curve.

A further object of the present invention is to provide a mechanism which also permits the car body to be tilted independently of the steering mechanism, that is, particularly prior to the operation thereof, or simultaneously with such operation, or even subsequently thereto. By means of the invention it is thus possible to adjust the inclination of the car body prior to the time when the vehicle enters the curve and thus to carry out such adjustment with less effort since it may then be done without having to overcome the centrifugal force.

Another object of the present invention is to provide a control mechanism which permits the car body to be tilted always in accordance with the operation of the car by its driver and to a degree as desired by him.

Another object of the present invention resides in providing a control for the tilting mechanism which may be operated by the steering mechanism so that the driver, by operating his steering wheel or an equivalent device, will both steer the vehicle and adjust the inclination of the car body.

A feature of the present invention therefore consists in a steering member which is capable of carrying out two different movements, one of which, for example, about a substantially horizontal axis, will effect the tilting of the car body, while the other movement, for example, about a substantially vertical axis, will effect the steering operation.

If the driver wishes, for instance, to drive into a right curve, he will operate the steering member which may be designed in the form of a simple two-armed lever similar to the steering bar of a motorcycle, first by pivoting the same about the horizontal axis, preferably in a clockwise direction toward the right, and then by turning it about a vertical axis to carry out the steering operation.

A further object of the present invention resides in providing a mechanism for inclining the car body, the design and operation of which is as simple and effective as possible, and which requires the least possible effort for its adjustment.

Another feature of the invention consists in the provision of a servo force, for example, an auxiliary hydraulic force, for operating the mechanism for tilting the vehicle body. Another feature of the invention consists in adjusting the thrust bearings of the springs at one or the other side of the vehicle in a direction opposed to the action of the springs so that the springs will tend to force the wheels at the outside of the curve more strongly upon the road relative to the vehicle, and will therefore tilt the car body in the opposite direction.

A further object of the present invention is to provide a mechanism as described which also permits the steering operation to be carried out with the least physical effort as possible.

Another object of the invention is to provide a new combination of the steering mechanism with at least one headlight of the vehicle so that the latter may be driven through curves at night with greater safety and the curves will be properly illuminated at the right time.

A feature of the invention for attaining such object consists in mounting the headlight or headlights so as to be adjustable and to control such adjustment in accordance with the operation of the tilting mechanism so that when the latter is actuated to tilt the car body, the headlight will be pivoted simultaneously in the direction of the curve, and such curve will be properly illuminated even before the vehicle actually enters the same.

Another object of the invention consists in improving the driving action of a vehicle in curves and thus the safety of operation of the vehicle by adjusting the wheels thereof so as to oppose the centrifugal forces acting upon the wheels.

A further object of the present invention is to improve the position of the center of gravity of the vehicle in a curve, as well as to improve the resiliency of the vehicle.

A feature of the invention for attaining the last-mentioned objects consists in suspending both the front wheels as also the rear wheels of the vehicle in their relation to the car body in such a maner that, when the car body tilts, they will also tilt toward the inside of the curve and thus increase their supporting action by bracing themselves against the curve. The resultant of the wheel pressure and the lateral force caused by the centrifugal action will then be moved more closely toward the wheel level, and the center of gravity of the vehicle will at the same time also be shifted toward the inside of the curve. Such displacement of the center of gravity is of considerable importance not only for reducing the danger of rolling over sideways but chiefly also for properly balancing the load upon the wheels so that they will be as uniformly loaded as possible, and the position of the vehicle relative to the road will be more nearly like that of a vehicle having a much wider gauge.

Thus, even though the vehicle might be of smaller gauge and provided with soft alternating springs, it will be subject to less tilting vibration and less inclination to shake.

A further object of the invention is to provide a steering member of great simplicity which is easy to operate. It preferably consists of a two-armed lever which also insures a more perfect view which is thus not blocked by the customary steering wheel. The gear shift, as well as the directional and horn signals may also be operated from such steering member without lifting a hand therefrom. Also such arrangement permits the instruments on the dashboard to be read more easily.

Still further objects, features, and advantages of the present invention will appear from the following detailed description and the accompanying drawings, in which—

Fig. 4 shows a diagrammatic perspective view of the chassis of a vehicle designed according to the invention;

Figure 5 shows a modified right rear wheel suspension including an additional coil spring; and Figure 6 is an enlarged view of the cylinder 17 of Figure 4 showing one embodiment of the piston structure supported therein.

Figure 1:
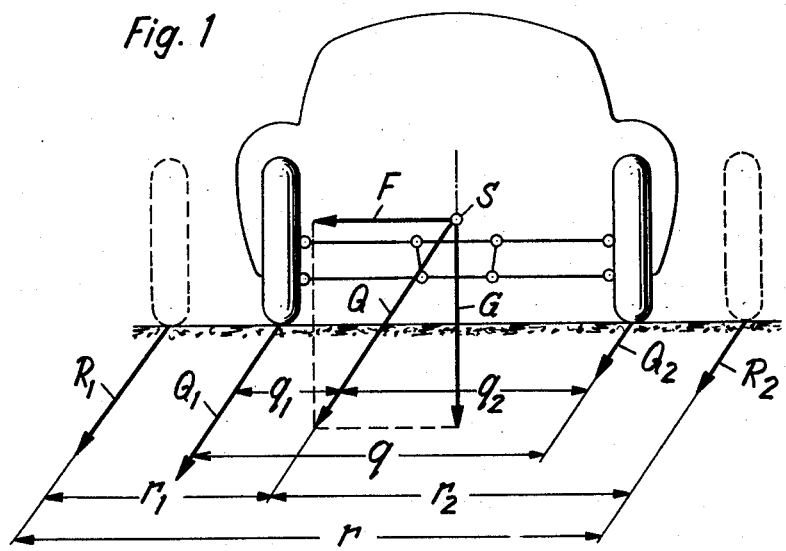
Fig. 1 shows a diagrammatical illustration of the action of a vehicle, the wheels of which are supported by a quadrangle of supporting members, and which is not provided with a tilting mechanism according to the invention.

Referring to the drawings, Fig. 1 shows an average car as seen from behind while driving through a right curve. The centrifugal force F acting upon the center of gravity S and the weight G will then produce a resultant force Q whereby, at a wheel gauge $q$, the wheel pressures $Q_1$ and $Q_2$ which are equal when driving in a straight direction, are varied in accordance with the leverages $q_1$ and $q_2$ so that $Q_1$ will become equal to $q_2/q.Q$ and $Q_2$ equal to $q_1/q.Q$. Although not particularly shown in the drawing, the center of gravity S is then usually also slightly shifted toward the outside of the curve. The nonuniformity in the distribution of the wheel pressures on the road thus increases and becomes so much more unfavorable the narrower the wheel gauge of the vehicle, and will be so much more favorable the wider the gauge. Thus, for example, the distribution of the wheel pressures of a vehicle with a wider wheel gauge becomes considerably more uniform in accordance with the more favorable leverage ratio $r_1:r_2$, as indicated by the forces $R_1$ and $R_2$.

Figure 2:
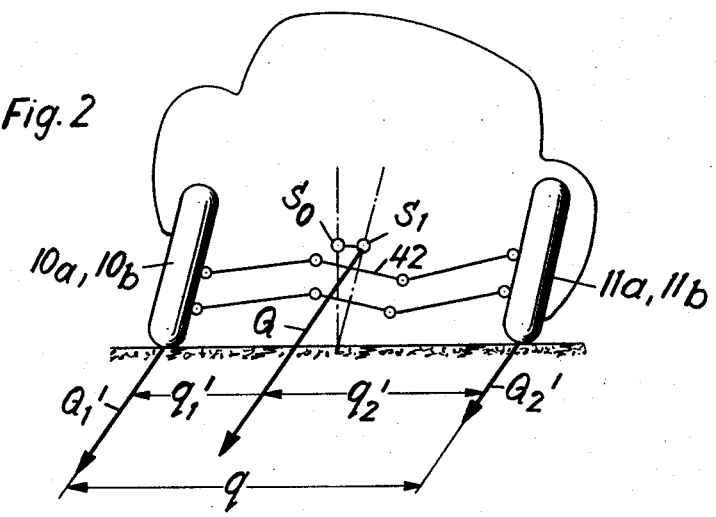
Fig. 2 shows a diagrammatical illustration of the action of a vehicle which is provided with a mechanism according to the invention for tilting the vehicle body toward the inside of a curve.

If, however, the car body, as well as the wheels, are inclined toward the inside of the curve, as shown in Fig. 2, the center of gravity will then shift from the point $S_0$ to the point $S_1$ so that at a small gauge $q$ of the wheels the leverage ratio $q_1/q_2$ will be considerably improved over that shown in Fig. 1, and may, for example, be equally favorable as that of a vehicle, the body and wheels of which cannot be inclined in a curve, but which has a much wider wheel gauge $r$.

Figure 3:
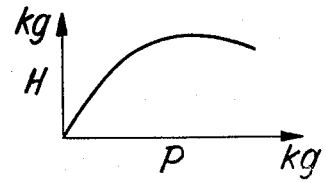
Fig. 3 shows a diagram illustrating the lateral guiding force of the wheels and its dependency upon the wheel load.

The uniform distribution of the wheel pressure is of special importance insofar as practical tests have shown that the lateral guiding force H of the tires, as shown in Fig. 3, does not increase in proportion with the wheel pressure P, but increases up to a maximum value whereupon it again decreases.

The present invention has the advantage that the highest admissible wheel pressure will not be attained until the centrifugal forces have increased considerably and are much higher than in a vehicle in which the car body and the wheels cannot be inclined in a curve.

In a preferred embodiment of the invention, as shown in Fig. 4, both the front wheels 10a and 10b, as well as the rear wheels 11a and 11b of the vehicle are each individually suspended on and supported by two members mounted above each other, and independently of each other relative to the body of the vehicle which may be either a frame or a self-supporting car body. Of these supporting members only the lower ones 12a, 12b, 13a, and 13b have been shown in the drawing, while the upper supporting members have been omitted for the purpose of a clearer illustration of the invention. Further, it is assumed in the drawing, Fig. 4, that all four wheels are driven, as indicated by the wheel drive shafts 9; however, the assembly may be modified so that either only the front wheels or the rear wheels may be driven. The engine of the vehicle may be mounted at any suitable point, that is, for example, either in the front or the rear of the vehicle. The necessary resiliency may be provided by means of torsion rods 14a and 14b for the front wheels 10a and 10b, and 15a and 15b for the rear wheels 11a and 11b. These torsion rods may be mounted on the inner ends of the lower wheel supporting members 12a, 12b, 13a and 13b, respectively, and so as to be arranged in pairs side by side and one behind the other. The inner ends of the torsion rods are supported by levers 16a and 16b, respectively, which are connected to one or more pistons within a servo cylinder 17 which is disposed substantially at the center between the front and rear axles and in a transverse direction below the floor boards of the vehicle. The cylinder 17 may include a single piston 17a which is connected by means of piston rods 17b and 17c to the lever arms 16a and 16b shown in Figure 4. The piston rods 17b and 17c, seen in Figure 6, extend through the ends of the cylinder 17 and are sealed therein by suitable sealing means. By means of the control device 26, operated by shaft 25, as seen in both Figures 4 and 6, fluid pressure medium is conducted (in a manner not illustrated) into the pressure chambers 17d and 17e of the cylinder to displace the piston 17a in the appropriate direction to simultaneously adjust both lever arms 16a and 16b.

For steering the front wheels, a steering member 19 is disposed in front of the driver's seat 18. This steering member 19 is designed in a form similar to the front wheel fork of a motorcycle, that is, as a double lever which is provided with handles at its outer ends, and so as to be pivotable, on the one hand, about a substantially vertical axis A—A and, on the other hand, about a substantially horizontal axis B—B. Thus the steering member 19 has two independent modes of movement wherein rotation in either direction about the axis B—B to control tilting is considered as only one mode of movement and the other movement, for example rotation in either direction about the axis A—A, is a mode of movement differing from the aforementioned one mode, and considered an independent mode used for steering. For this purpose, double lever 19 is mounted by means of a short vertical link 20 on a shaft 21 which carries a lever 22 which, in turn, is connected by a rod 23 with a lever 24 on a shaft 25 which is designed to adjust a control mechanism 26 for the servo cylinder 17.

Furthermore, double lever 19 is pivotally mounted by means of a ball and socket joint 27 on a rod 28 which is pivotally connected to a lever 29 on a vertical shaft 30. This shaft 30 carries the steering lever 31 which operates in the customary manner the three-part steering rod 32 of the front wheels. Rod 28 at the same time operates a control mechanism 33 for a servo cylinder 34 which cooperates with and supports the steering action produced by hand. For this purpose, the piston sliding in cylinder 34 and adjusted by the auxiliary force thereof is connected through a lever 35 to the steering lever 31 on the steering rod 32. The control mechanism 26 for the servo cylinder 17 as well as the control mechanism 33 for the servo cylinder 34 are connected by respective lines 26' and 33' to a suitable power source such as a conventional hydraulic pump P which in turn may be driven by the vehicle engine and supported in any conventional manner on the vehicle.

On an extension 36, shaft 21 carries a lever 37 which is pivotably connected through a rod 38 with the lever 39 on a shaft 41 which carries a head light 40.

If the car should enter into a curve, for example, a right curve R, as indicated in Fig. 4 by an arrow, the driver will first pivot the steering handle 19 in a clockwise direction of the double arrow $b$ about a substantially horizontal axis B—B, that is, in the same sense in which the car body is intended to be tilted toward the inside of the curve. Hereby the control mechanism 26 for servo cylinder 17 will be actuated through rods 21, 22, 23, 24, and 25, whereby the piston acting upon the levers 16a will be forced outwardly in the direction as shown by the arrow $x$. Such outward movement tightens the torsion rods 14a and 15a which forces the guide rods 12a and 13a downwardly. This, in turn, causes a tilting of the car body 42 and simultaneously a negative tilting of the outer wheels 10a and 11a, as well as of the inner wheels 10b and 11b toward the inside of the curve, which results in a shoring or bracing action of the tires along the curve.

If desired, the springs directed toward the inside of the curve may also be adjusted, i.e. released, simultaneously with the adjustment of the opposite springs, i.e. those directed toward the outside of the curve. Furthermore, it is within the concept of the invention to provide additional springs, for example, coil springs, aside from the adjustable springs for supporting the wheels directly relative to the car body. Such an arrangement as may be applied to each of the four wheel suspensions is illustrated in Figure 5, wherein the additional coil spring 46 is retained in compression between the guide member 13b and a fixed abutment 45 on the car body or frame. The parts 9, 13b and 15b in Figure 5 correspond to the parts bearing like reference numerals in Figure 4.

Simultaneously with the action causing the car body to incline laterally, rods 21, 36, 37, 38, and 39 also turn the headlight 40 about its vertical axis 41 toward the right direction of the double arrow y in Fig. 4, and thus into the curve through which the vehicle is to be driven.

As soon as the vehicle proceeds to a curve, steering handle 19 is pivoted about the substantially vertical axis A—A in the clockwise direction of double arrow a. By such operation, rods 28, 29, 30 and 31 adjust the steering rod 32 of the wheels so that the front wheels 10a and 10b will turn into the curve. At the same time, the control mechanism 33 of the piston in cylinder 34 will be acted upon so as to assist the steering movement of the handle bar 19 to the extent of the deflection of lever 35 as adjusted. Even though the steering angles of handle bar 19 are quite small, such steering will be considerably facilitated by such auxiliary operation which also prevents or cushions the knocking and shimmying of the steering system and thus assures a safer driving, as well as a less tiring operation of the vehicle. For stabilizing the central position of the car body, special arresting or centering springs may be provided, for example, in such a manner that the springs will hold the car body with a certain force in the central position and so that the inclining adjustment will not become effective until the force of the adjustment exceeds the strength of such spring force.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. A motor vehicle comprising a vehicle body, vehicle wheels, resilient means for suspending said wheels on said body, means for steering at least some of said wheels, a steering member including means mounting said member for adjustment in two different directions of movement so that said steering means will be adjusted by a movement thereof in one direction, means for tilting said vehicle body against the action of said resilient means toward one or the other side of said vehicle, and means for connecting said steering member with said tilting means so as to actuate said tilting means when said steering member is adjusted by a movement thereof in the other direction, said steering means and said tilting means being adjustable independently of one another at said steering member.

2. A motor vehicle as defined in claim 1, wherein said connecting means connect said steering member with said tilting means so that for tilting said vehicle body toward one of the two sides of the vehicle, said steering member has to be moved similarly toward the same side.

3. A motor vehicle comprising a vehicle body, vehicle wheels, resilient means for suspending said wheels on said body, means for steering at least some of said wheels, a steering member including means supporting said member for adjustment in two different directions of movement so that said steering means will be adjusted only by a movement thereof in one direction, means for tilting said vehicle body against the action of said resilient means toward one or the other side of said vehicle, means for connecting said steering member with said tilting means so as to actuate said tilting means only when said steering member is adjusted by a movement thereof in the other direction, a rotatable supporting member for said steering member for rendering said steering member adjustable, and pivotal means for pivotally mounting said steering member on said supporting member for enabling said steering member to be rotatable both about an axis extending in the direction of said supporting member, as well as about an axis substantially perpendicular to said first axis whereby, when said steering member is adjusted to direct said vehicle in a straight direction, both rotary axes are disposed substantially in a vertical plane extending in the driving direction.

4. A motor vehicle as defined in claim 3, wherein one of said axes is substantially vertical and the other is substantially horizontal, said means for connecting said steering member with said steering means and said means for connecting said steering member with said tilting means being connected to said steering member in such a manner that when said steering member is being turned about said substantially vertical axis, said steering means are actuated, and when said steering member is being turned about said substantially horizontal axis, said tilting means are actuated.

5. A motor vehicle as defined in claim 3, wherein said supporting member is rotatable about a substantially horizontal axis, and said vertical axis extends substantially perpendicularly to the ground.

6. A motor vehicle comprising a vehicle body, vehicle wheels, resilient means for suspending said wheels on said body, means for steering said wheels, a supporting member mounted on said body and rotatable about an axis extending substantially in the longitudinal direction of said vehicle, a steering member, means for mounting said steering member on said supporting member so as to be rotatable about an axis extending substantially perpendicularly to said first axis, said second axis extending within a substantially vertical longitudinal plane of said vehicle when said rotatable supporting member is disposed in a central position, means engaging said steering member outside of said second axis and connecting said steering member with said steering means so that, when said steering member is turned about said second axis in one or the other directions, said wheels are steered in a corresponding direction, means for tilting said vehicle body against the action of said resilient suspension means, means for connecting said supporting member with said tilting means so that, when said supporting member is turned together with said steering member from its central position about its first rotary axis toward one or the other direction, said vehicle body will be tilted toward one or the other side of the vehicle against the action of said resilient means.

7. A motor vehicle as defined in claim 6, wherein said steering member forms a double-armed lever, said lever being mounted on said supporting member so as to be rotatable about said first axis.

8. A motor vehicle as defined in claim 1, wherein said resilient suspension means for each wheel comprise two supporting elements disposed above each other and connecting said wheel with said vehicle body so that the wheel is able to move upwardly and downwardly relative to said vehicle body, and a spring member at one end connected with the end of said supporting elements cooperating with said vehicle body, and at the other end mounted on said body and also connected with said tilting means, so that said spring member may be adjusted in the direction of its spring action by an adjustment of said tilting means.

9. A motor vehicle as defined in claim 8, wherein said spring member forms a torsion rod extending in the longitudinal direction of said vehicle.

10. A motor vehicle as defined in claim 1, wherein said wheels comprise front and rear wheels, and said tilting means comprise means for tensioning said resilient means of the front and rear wheel at one side of said vehicle, means for tensioning said resilient means of the front and rear wheel at the other side of said vehicle, and common means for operating said two means so as to tension said resilient means in such a manner that when the resilient means of one side of said vehicle are tensioned, the resilient means of the other side of said vehicle will be released.

11. A motor vehicle comprising a vehicle body, front and rear vehicle wheels, resilient means for suspending said wheels on said body, means for steering at least some of said wheels, a steering member including means mounting said member for adjustment in two different directions of movement so that said steering means will be adjusted only by a movement thereof in one direction, means for tilting said vehicle body against the action of said resilient means toward one or the other side of said vehicle, means for connecting said steering member with said tilting means so as to actuate said tilting means only when said steering member is adjusted by a movement thereof in the other direction, said tilting means comprising means for tensioning said resilient means of the front and rear wheels at one side of said vehicle, means for tensioning said resilient means of the front and rear wheels at the other side of said vehicle, and common means comprising a cylinder and piston for operating said two tensioning means for tensioning said resilient means in such a manner that when the resilient means of one side of said vehicle are tensioned, the resilient means of the other side of said vehicle are released, said piston being movable in said cylinder and adapted to act in opposite directions upon said two means for tensioning said resilient means, said connecting means including means connected to said cylinder for conducting a servo medium thereto for operating said piston, and means for controlling said servo medium by means of said steering member.

12. A motor vehicle according to claim 1, wherein said resilient suspension means are designed so that when said vehicle body is being tilted toward one side of said vehicle, said wheels are tilted toward the same side by said suspension means.

13. A motor vehicle comprising a vehicle body, vehicle wheels, resilient means for suspending said wheels on said body, means for steering at least some of said wheels, a steering member including means mounting said member for adjustment in two different directions of movement so that said steering means will be adjusted only by a movement thereof in one direction, means for tilting said vehicle body against the action of said resilient means toward one or the other side of said vehicle, means for connecting said steering member with said tilting means so as to actuate said tilting means only when said steering member is adjusted by a movement thereof in the other direction, said steering means comprising a mechanical steering rod connecting said steering member with the wheels to be steered, and servo means connected in parallel with said steering rod for assisting in the steering movement of said wheels during the operation of said steering member.

14. A motor vehicle comprising a vehicle body, vehicle wheels, resilient means for suspending said wheels on said body, means for steering at least some of said wheels, a steering member including means mounting said member for adjustment in two different directions of movement so that said steering means will be adjusted only by a movement thereof in one direction, means for tilting said vehicle body against the action of said resilient means toward one or the other side of said vehicle, means for connecting said steering member with said tilting means so as to actuate said tilting means only when said steering member is adjusted by a movement thereof in the other direction, at least one headlight, means for mounting said headlight for pivotal movement about a vertical axis, and means connecting said steering member with said headlight for pivoting the same by means of said steering member.

15. A motor vehicle as defined in claim 14, wherein said last connecting means are connected to the means connecting said steering member with the means for tilting said vehicle body in such a manner that when said vehicle body is being tilted, said headlight is pivoted simultaneously about said vertical axis.

16. A motor vehicle as defined in claim 6, further comprising at least one headlight on said vehicle, means for mounting said headlight for pivotal movement about a substantially vertical axis, and a lever connecting said supporting member with said last means in such a manner that when said vehicle body is being tilted, said headlight is pivoted simultaneously about said vertical axis.

17. A motor vehicle comprising a vehicle body, front and rear vehicle wheels, resilient means for suspending said wheels on said body, means for steering at least some of said wheels, a steering member including means mounting said member for adjustment in two different mutually perpendicular directions of movement so that said steering means will be adjusted by a movement thereof in one direction, means for tilting said vehicle body against the action of said resilient means toward one or the other side of said vehicle, means for connecting said steering member with said tilting means so as to actuate said tilting means when said steering member is adjusted by a movement thereof in the other direction, said tilting means comprising means for tensioning said resilient means of the front and rear wheels at one side of said vehicle, means for tensioning said resilient means of the front and rear wheels at the other side of said vehicle, and common means comprising a cylinder and piston for operating said two tensioning means for tensioning said resilient means in such a manner that when the resilient means of one side of said vehicle are tensioned the resilient means of the other side of said vehicle are released, said piston being movable in said cylinder and adapted to act in opposite directions upon said two means for tensioning said resilient means, said connecting means including means connected to said cylinder for conducting a servo medium thereto for operating said piston, and means for controlling said servo medium by means of said steering member.

18. A motor vehicle comprising a vehicle body, front and rear vehicle wheels at each side of the vehicle, resilient torsion rod means for suspending said wheels on said body, means for steering at least some of said wheels, a steering member including means mounting said member for adjustment in two different mutually independent modes of movement so that said steering means will be adjusted by a movement thereof in one mode, means for tilting said vehicle body against the action of said resilient means toward one or the other side of said vehicle, means for connecting said steering member with said tilting means so as to actuate said tilting means when said steering member is adjusted by a movement thereof in the other mode, said tilting means comprising means for tensioning said resilient torsion rod means of the front and rear wheels at one side of said vehicle, means for tensioning said resilient torsion rod means of the front and rear wheels at the other side of said vehicle, and common means comprising only a single cylinder and piston for operating said two tensioning means for tensioning said resilient means in such a manner that when the resilient means of one side of said vehicle are tensioned, the resilient means of the other side of said vehicle are released, said piston being movable in said cylinder and connected to act in opposite directions upon said two means for tensioning said resilient means, said connecting means including means connected to said cylinder for conducting a servo medium thereto for operating said piston, and means for controlling said servo medium by means of said steering member.

19. A motor vehicle comprising a vehicle body, vehicle wheels, resilient means for suspending said wheels on said body, means for steering at least some of said wheels, a steering member including means mounting said member for adjustment in two different directions of movement so that said steering means will be adjusted by a movement thereof in one direction, means for adjusting said vehicle body to laterally shift the center of gravity relative the points of contact of the vehicle wheels with a road surface, and means for connecting said steering member with said body adjusting means so as to actuate said body adjusting means when said steering member is adjusted by a movement thereof in the other direction, said steering means and said body-adjusting means being adjustable independently of one another at said steering member.

20. A motor vehicle comprising a vehicle body and four road wheels, some of the wheels being steerable, spring suspension means for suspending said wheels relative to said body, body tilting means adapted at certain times to stiffen said spring means for the wheels at one side of the vehicle while relaxing said spring means for the wheels at the other side of the vehicle, power steering means for said steerable road wheels including manually operable means for controlling said power steering means, a single power source means for said power steering means and said body tilting means and means for controlling the action of said power source means upon said power steering means and said body tilting means in response to operation of said manually operable means, said manually operable means being so constructed and arranged as to have two independent modes of operation for actuation of said steering means and said tilting means, respectively.

References Cited in the file of this patent
UNITED STATES PATENTS

| | | |
|---|---|---|
| 1,808,039 | Hunter | June 2, 1931 |
| 2,260,102 | Freret | Oct. 21, 1941 |
| 2,615,727 | Bancroft | Oct. 28, 1952 |
| 2,757,938 | Crowder | Aug. 7, 1956 |
| 2,804,311 | Pobanz | Aug. 27, 1957 |